(12) United States Patent
Cheng

(10) Patent No.: US 9,065,514 B2
(45) Date of Patent: Jun. 23, 2015

(54) METHOD FOR TRANSMITTING POWER OFFSET INFORMATION OF SECONDARY COMMON PILOT CHANNEL AND RADIO NETWORK CONTROLLER

(75) Inventor: Xiang Cheng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 164 days.

(21) Appl. No.: 13/991,809

(22) PCT Filed: Oct. 26, 2011

(86) PCT No.: PCT/CN2011/081335
§ 371 (c)(1),
(2), (4) Date: Jun. 5, 2013

(87) PCT Pub. No.: WO2012/075864
PCT Pub. Date: Jun. 14, 2012

(65) Prior Publication Data
US 2013/0258990 A1    Oct. 3, 2013

(30) Foreign Application Priority Data
Dec. 10, 2010   (CN) .......................... 2010 1 0584073

(51) Int. Cl.
*H04W 52/02* (2009.01)
*H04W 80/04* (2009.01)
(Continued)

(52) U.S. Cl.
CPC ............. *H04B 7/0623* (2013.01); *H04W 52/16* (2013.01); *H04W 52/325* (2013.01)

(58) Field of Classification Search
CPC . H04W 52/02; H04W 52/0216; H04W 80/04; H04W 88/06; H04W 28/04; H04W 72/04
USPC .......................................... 370/311, 328, 329
See application file for complete search history.

(56) References Cited

U.S. PATENT DOCUMENTS 7,209,456 B2   4/2007   Kwak et al.
7,907,570 B2   3/2011   Hwang
(Continued)

FOREIGN PATENT DOCUMENTS

| CN | 1462124 | 12/2003 |
|---|---|---|
| CN | 1653830 | 8/2005 |
| CN | 101651909 | 2/2010 |
| CN | 101854683 | 10/2010 |

OTHER PUBLICATIONS

International Search Report for PCT/CN2011/081335, English translation attached to original, Both completed by the Chinese Patent Office on Jan. 11, 2012, All together 5 Pages.

*Primary Examiner* — Ronald B Abelson
(74) *Attorney, Agent, or Firm* — Brooks Kushman P.C.

(57) ABSTRACT

A method for transmitting power offset information of a secondary common pilot channel and a radio network control, including: after a drift radio network control receives request information sent by a serving radio network control and used for requesting the drift radio network control to feed back power offset information of respective secondary common pilot channels of managed target primary and secondary carrier cells, the drift radio network control setting following kinds of information elements with reference to MIMO pilot modes used respectively by target primary and secondary carrier cells: power offset information of a secondary common pilot channel of a single carrier cell, power offset information of a secondary common pilot channel of a primary carrier cell, and power offset information of a secondary common pilot channel of a secondary carrier cell, and feeding back set information elements to the serving radio network control through an IUR.

12 Claims, 3 Drawing Sheets

(51) Int. Cl.
*H04W 88/06* (2009.01)
*H04W 28/04* (2009.01)
*H04W 72/04* (2009.01)
*H04B 7/06* (2006.01)
*H04W 52/16* (2009.01)
*H04W 52/32* (2009.01)

(56) References Cited

U.S. PATENT DOCUMENTS

2010/0322100 A1* 12/2010 Wan et al. .................. 370/252
2012/0033643 A1*  2/2012 Noh et al. ................... 370/335

* cited by examiner

METHOD FOR TRANSMITTING POWER OFFSET INFORMATION OF SECONDARY COMMON PILOT CHANNEL AND RADIO NETWORK CONTROLLER

CROSS-REFERENCE TO RELATED APPLICATION

This application is the U.S. national phase of PCT Application No. PCT/CN2011/081335 filed on Oct. 26, 2011, which claims priority to Chinese Patent Application No. 201010584073.1, filed on Dec. 10, 2010, the disclosures of which are incorporated in their entirety by reference herein.

TECHNICAL FIELD

The present document relates to a wireless communication system, and in particular, to a method for transmitting power offset information of a secondary common pilot channel and a radio network control.

BACKGROUND OF THE RELATED ART

The Wide band Code Division Multiple Access (WCDMA) is a kind of 3rd generation wireless communication systems, and its air interface uses a method of code division multiplexing to perform a broadband spread spectrum wireless communication and provide data transmission services to an upper layer.

In the air interface of the WCDMA, a carrier bandwidth is 5 MHz (megahertz), the frequency bands are used in pairs, namely, one for uplink, and the other for downlink. The air interface of the traditional WCDMA only uses a pair of frequency bands (one carrier for uplink, and one carrier for downlink), to transfer the data between a terminal and a node B. For the next technique development trend of the WCDMA, a multi-carrier high-speed downlink packet access technique has very obvious and unique advantages. On this basis, a Multiple-Input Multiple-Output (MIMO) technique is also applied rapidly. The MIMO can improve the capacity of the channel, and improves the reliability of the channel and reduces the bit error rate at the same time; the former is due to a utilization of a spatial multiplexing gain provided by the MIMO channel, and the latter is due to a utilization of a space diversity gain provided by the MIMO channel. For the MIMO system, multipath is utilized as a favorable factor. The MIMO system adopts multi-antenna (or array antenna) and multi-channel on both the transmitting end and the receiving end, and the multi-input multi-output of the MIMO is for the multipath wireless channel. The transmitted information flow forms a plurality of information sub-flows through space-time coding. This plurality of information sub-flows are launched out by a plurality of antennas, and received by a plurality of receiving antennas after passing through the space channel. The multi-antenna receiver can separate and decode these data sub-flows by utilizing the advanced space-time coding processing, thus realizing the optimal processing.

In one cell, a common pilot channel can be used to estimate the channels seen from different antennas respectively. Wherein, an antenna sends a primary common pilot channel with a modulation mode of "antenna mode one"; and another antenna can send the primary common pilot channel with a modulation mode of "antenna mode two", and also can send a secondary common pilot channel with the modulation mode of "antenna mode one".

Such a MIMO pilot frequency configuration mode that an antenna sends the primary common pilot channel with the modulation mode of "antenna mode one", and, another antenna sends the secondary common pilot channel with the modulation mode of "antenna mode one" is called a MIMO pilot mode of the "primary and secondary common pilot channel".

In the MIMO pilot mode of the "primary and secondary common pilot channel", the secondary common pilot channel provides information of the phase difference of the second transmitting antenna of the MIMO. A ratio of the transmission power of the primary common pilot channel to the transmission power of the secondary common pilot channel is called "power offset of the secondary common pilot channel operated for the MIMO". The nominal unit of the "power offset of the secondary common pilot channel operated for the MIMO" is Decibel (dB), of which the range is usually between −6 and 0. When the "power offset of the secondary common pilot channel operated for the MIMO" is 0, it just means that there is no power offset of the transmission power of the secondary common pilot channel relative to the transmission power of the primary common pilot channel, and the transmission power of the secondary common pilot channel equals to the transmission power of the primary common pilot channel.

In order to state concisely, the "power offset of the secondary common pilot channel operated for the MIMO" is abbreviated as the power offset of the secondary common pilot channel. The expression approach of the power offset of the secondary common pilot channel will be used hereinafter.

One cell has one and only one carrier, when a single carrier high-speed downlink packet access technique is used, the cell where the single carrier locates and which performs the data transmission by using the high-speed downlink packet access technique is called a single carrier cell. When the multi-carrier high-speed downlink packet access technique is used, at least 2 cells which use the high-speed downlink packet access technique to perform the data transmission must be required, wherein, the carrier of one cell is a primary carrier, and the carrier of another cell is a secondary carrier. The cell where the primary carrier locates and which uses the high-speed downlink packet access technique to perform the data transmission is called the primary carrier cell; and the cell where the secondary carrier locates and which uses the high-speed downlink packet access technique to perform the data transmission is called the secondary carrier cell.

When the multi-carrier high-speed downlink packet access technique is used, the primary carrier cell and the secondary carrier cell can use the MIMO separately in the downlink direction. For example, the primary carrier cell can use the MIMO pilot mode of "the primary and secondary common pilot channels" in the downlink direction; each secondary cell can also use MIMO pilot mode of "the primary and secondary common pilot channels" in the downlink direction. Utilization of the MIMO of each primary and secondary carrier cells other is independent with each other, and there is no restrained relationship. In the MIMO pilot mode of "the primary and secondary common pilot channels", the ratio of the transmission power of the primary common pilot channel to the transmission power of the secondary common pilot channel of this cell needs to be transmitted, so as to enable the terminal to decode and receive the high-speed downlink packet access data in the downlink direction of the cell.

An IUR (Interconnection of RNC, the interconnection interface between the radio network controls) is an interface used by a radio network control to perform the signaling and data interaction with other radio network controls, it is a bond of the interconnection between the wireless network subsystems.

When a terminal establishes a connection from the terminal to a wireless access network, and produces a soft handover on an IUR interface, then the resources of more than one radio network controls will be used; different radio network controls serve as different roles at this moment:

a Serving Radio Network Control (SRNC). A radio network control that keeps the interface connection of the terminal and the core network is the serving radio network control. The serving radio network control is responsible for the data transmission between the core network and the terminal, and the transmission and receiving of the interface signaling of the core network, responsible for performing the wireless resource controlling, and responsible for performing the processing of layer two for the data of the air interface, and executing the basic management operations of the radio resources, such as, a handover decision, an external loop power control, and a transformation from parameters born by a radio access to parameters of an air interface transmission channel, etc.

a Drift Radio Network Control (DRNC). A drift radio network control is another kind of radio network control except the serving radio network control. The drift radio network control controls a cell used by the terminal; if necessary, the drift radio network control can perform a macro-diversity combination. Unless the terminal uses a common transmission channel, the drift radio network control will not perform the layer two processing of the data on the terminal plane, while it only transparently transmits the air interface data to the serving radio network control through a route of the IUR interface. The drift radio network control of one terminal can be of more than one.

When the terminal prepares to move across the IUR interface (such as, the handover, serving cell changing, etc.), to hand over from source primary and secondary carrier cells managed by the serving radio network control to target primary and secondary carrier cells managed by the drift radio network control, the serving radio network control needs to request the drift radio network control through the IUR interface to feed back the power offset information of respective secondary common pilot channels of the target primary and secondary carrier cells managed by the drift radio network control to the serving radio network control. The serving radio network control informs the terminal of the power offset information of respective secondary common pilot channels of the target primary and secondary carrier cells managed by the drift radio network control through the air interface, and then the terminal can only correctly access and use the resources of the target primary and secondary carrier cells managed by the drift radio network control.

However, the inventor of the application of the present document finds in practice that: in real application, during the process of "the serving radio network control needs to request the drift radio network control through the IUR interface to feed back the power offset information of respective secondary common pilot channels of the target primary and secondary carrier cells managed by the drift radio network control to the serving radio network control", a phenomenon will appear that part of the serving radio network controls are unable to resolve the power offset information of respective secondary common pilot channels of the target primary and secondary carrier cells all the time.

SUMMARY OF THE INVENTION

The object of the present document is to provide a method for transmitting power offset information of a secondary common pilot channel and a radio network control, and said method can be a method for transmitting power offset information of a secondary common pilot channel using a multi-carrier high-speed downlink packet access technique in the 3rd generation wireless communication system and a radio network control, so as to solve the problem that how to enable all serving radio network controls to resolve power offset information of respective secondary common pilot channels of primary and secondary carrier cells as far as possible.

In order to solve the above-mentioned technical problem, the present document provides a method for transmitting power offset information of a secondary common pilot channel, comprising:

after a drift radio network control receives request information sent by a serving radio network control and used for requesting the drift radio network control to feed back power offset information of respective secondary common pilot channels of target primary and secondary carrier cells managed by the drift radio network control, the drift radio network control setting following information elements with reference to multiple-input multiple-output (MIMO) pilot modes used respectively by the target primary and secondary carrier cells: an information element of power offset information of a secondary common pilot channel of a single carrier cell, an information element of power offset information of a secondary common pilot channel of a primary carrier cell, and an information element of power offset information of a secondary common pilot channel of a secondary carrier cell, and feeding back the set information elements to the serving radio network control through an interconnection interface between the radio network controls.

In the method of the present document, the step of the drift radio network control setting information elements with reference to MIMO pilot modes used respectively by the target primary and secondary carrier cells comprises:

when the drift radio network control judges that the target primary and secondary carrier cells all do not use the MIMO pilot mode of the primary and secondary common pilot channels in a downlink direction, the drift radio network control setting the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell all as null.

In the method of the present document, the step of the drift radio network control setting information elements with reference to MIMO pilot modes used respectively by the target primary and secondary carrier cells comprises:

when the drift radio network control judges that the target primary and secondary carrier cells all use the MIMO pilot mode of the primary and secondary common pilot channels in a downlink direction, and when a power offset of the secondary common pilot channel of the target primary carrier cell is the same with a power offset of the secondary common pilot channel of the target secondary carrier cell, the drift radio network control setting the power offset into the information element of the power offset information of the secondary common pilot channel of the single carrier cell, and setting both the information element of the power offset information of the secondary common pilot channel of the primary carrier cell and the information element of the power offset information of the secondary common pilot channel of the secondary carrier cell as null.

In the method of the present document, the step of the drift radio network control setting information elements with reference to MIMO pilot modes used respectively by the target primary and secondary carrier cells comprises:

when the drift radio network control judges that the target primary and secondary carrier cells all use the MIMO pilot mode of the primary and secondary common pilot channels in a downlink direction, and when a power offset of the secondary common pilot channel of the target primary carrier cell is different from a power offset of the secondary common pilot channel of the target secondary carrier cell, the drift radio network control setting the information element the power offset information of the secondary common pilot channel of the single carrier cell as null, setting the power offset of the secondary common pilot channel of the target primary carrier cell into the information element of the power offset information of the secondary common pilot channel of the primary carrier cell, and setting the power offset of the secondary common pilot channel of the target secondary carrier cell into the information element of the power offset information of the secondary common pilot channel of the secondary carrier cell.

In the method of the present document, the step of the drift radio network control setting information elements with reference to MIMO pilot modes used respectively by the target primary and secondary carrier cells comprises:

when the drift radio network control judges that the target primary carrier cell uses the MIMO pilot mode of the primary and secondary common pilot channels in a downlink direction, and the target secondary carrier cell does not use the MIMO pilot mode of the primary and secondary common pilot channels in the downlink direction, the drift radio network control setting the information element of the power offset information of the secondary common pilot channel of the single carrier cell as null, setting the power offset of the secondary common pilot channel of the target primary carrier cell into the information element of the power offset information of the secondary common pilot channel of the primary carrier cell, and setting the information element of the power offset information of the secondary common pilot channel of the target secondary carrier cell as null.

In the method of the present document, the step of the drift radio network control setting information elements with reference to MIMO pilot modes used respectively by the target primary and secondary carrier cells comprises:

when the drift radio network control judges that the target primary carrier cell does not use the MIMO pilot mode of the primary and secondary common pilot channels in a downlink direction, and the target secondary carrier cell uses the MIMO pilot mode of the primary and secondary common pilot channels in the downlink direction, the drift radio network control setting the information element of the power offset information of the secondary common pilot channel of the single carrier cell as null, setting the information element of the power offset information of the secondary common pilot channel of the primary carrier cell as null, and setting the power offset of the secondary common pilot channel of the target secondary carrier cell into the information element of the power offset information of the secondary common pilot channel of the secondary carrier cell.

After the step of the drift radio network control feeding back the set information elements to the serving radio network control through an interconnection interface between the radio network controls, the method further comprises:

after the serving radio network control receives the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell fed back by the drift radio network control, determining the MIMO pilot modes used by the target primary and/or secondary carrier cell, and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element.

In order to solve the above-mentioned technical problem, the present document further provides a method for receiving power offset information of a secondary common pilot channel, comprising:

when a terminal prepares to move across an interconnection interface (IUR) between radio network controls, a serving radio network control to which the terminal belongs sending request information to a drift radio network control, wherein, the request information is used for requesting the drift radio network control to feed back power offset information of respective secondary common pilot channels of target primary and secondary carrier cells managed by the drift radio network control; and after the serving radio network control receives an information element of power offset information of a secondary common pilot channel of a single carrier cell, an information element of power offset information of a secondary common pilot channel of a primary carrier cell, and an information element of power offset information of a secondary common pilot channel of a secondary carrier cell fed back by the drift radio network control through the IUR, determining multiple-input multiple-output (MIMO) pilot mode used by a target primary carrier cell and/or a secondary carrier cell and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element.

In the method, the serving radio network control is an old version of the serving radio network control, that is, a serving radio network control which can only identify the information element of the power offset information of the secondary common pilot channel of the single carrier cell;

the step of the serving radio network control determining the MIMO pilot mode used by a target primary carrier cell and/or a secondary carrier cell, and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element comprises:

when the old version of the serving radio network control judges that the information element of the power offset information of the secondary common pilot channel of the single carrier cell is null, determining that both the target primary carrier cell and the target secondary carrier cell do not use the MIMO pilot mode of the primary and secondary common pilot channels in a downlink direction;

when the old version of the serving radio network control judges that the information element of the power offset information of the secondary common pilot channel of the single carrier cell is not null, determining that both the target primary carrier cell and the target secondary carrier cell use the MIMO pilot mode of the primary and secondary common pilot channels in the downlink direction, and the power offset of the secondary common pilot channel of the target primary carrier cell and the power offset of the secondary common pilot channel of the target secondary carrier cell are the same, that is, they are all equal to a value of the information element of the power offset information of the secondary common pilot channel of the single carrier cell.

In the method, the serving radio network control is a new version of the serving radio network control, that is, a serving radio network control which can identify following information elements: the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell;

the step of the serving radio network control determining the MIMO pilot mode used by a target primary carrier cell and/or a secondary carrier cell, and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element comprises:

when the new version of the serving radio network control judges that the information element of the power offset information of the secondary common pilot channel of the single carrier cell is not null, determining that both the target primary carrier cell and the target secondary carrier cell use the MIMO pilot mode of the primary and secondary common pilot channels in the downlink direction, and the power offset of the secondary common pilot channel of the target primary carrier cell and the power offset of the secondary common pilot channel of the target secondary carrier cell are the same, that is, they are all equal to a value of the information element of the power offset information of the secondary common pilot channel of the single carrier cell;

when the new version of the serving radio network control judges that the information element of the power offset information of the secondary common pilot channel of the single carrier cell is null, and the information element of the power offset information of the secondary common pilot channel of the primary carrier cell is not null, determining that the target primary carrier cell uses the MIMO pilot mode of the primary and secondary common pilot channels in the downlink direction, and a value of the power offset of the secondary common pilot channel of the target primary carrier cell equals to a value of the information element of the power offset information of the secondary common pilot channel of the primary carrier cell;

when the new version of the serving radio network control judges that the information element of the power offset information of the secondary common pilot channel of the single carrier cell is null and the information element of the power offset information of the secondary common pilot channel of the primary carrier cell is null, determining that the target primary carrier cell does not use the MIMO pilot mode of the primary and secondary common pilot channels in the downlink direction;

when the new version of the serving radio network control judges that the information element of the power offset information of the secondary common pilot channel of the single carrier cell is null, and the information element of the power offset information of the secondary common pilot channel of the secondary carrier cell is not null, determining that the target secondary carrier cell uses the MIMO pilot mode of the primary and secondary common pilot channels in the downlink direction, and a value of the power offset of the secondary common pilot channel of the target secondary carrier cell equals to a value of the information element of the power offset information of the secondary common pilot channel of the secondary carrier cell;

when the new version of the serving radio network control judges that the information element of the power offset information of the secondary common pilot channel of the single carrier cell is null, and the information element of the power offset information of the secondary common pilot channel of the secondary carrier cell is null, determining that the target secondary carrier cell does not use the MIMO pilot mode of the primary and secondary common pilot channels in the downlink direction.

In order to solve the above-mentioned technical problem, the present document further provides a radio network control for transmitting power offset information of a secondary common pilot channel, wherein, the radio network control acts as a drift radio network control, and the radio network control comprises a receiving module, a setting module and a sending module, the receiving module is configured to receive request information sent by a serving radio network control, and the request information is used for requesting the drift radio network control to feed back power offset information of respective secondary common pilot channels of target primary and secondary carrier cells managed by the drift radio network control;

the setting module is configured to, after the receiving module receives the request information sent by the serving radio network control, set following information elements with reference to multiple-input multiple output (MIMO) pilot modes used respectively by the target primary and secondary carrier cells: an information element of power offset information of a secondary common pilot channel of a single carrier cell, an information element of power offset information of a secondary common pilot channel of a primary carrier cell, and an information element of power offset information of a secondary common pilot channel of a secondary carrier cell; and the sending module is configured to feed back the set information elements to the serving radio network control through an interconnection interface between the radio network controls.

In the radio network control of the present document, the setting module comprises a first judgment unit and a first information element setting unit, wherein the first judgment unit is configured to: when judging that both the target primary and secondary carrier cells do not use the MIMO pilot mode of the primary and secondary common pilot channels in a downlink direction, notify the first information element setting unit;

the first information element setting unit is configured to: set the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell all as null;

the setting module further comprises a second judgment unit and a second information element setting unit, wherein, the second judgment unit is configured to: when judging that both the target primary and secondary carrier cells use the MIMO pilot mode of the primary and secondary common pilot channels in the downlink direction, and a power offset of the secondary common pilot channel of the target primary carrier cell and a power offset of the secondary common pilot channel of the target secondary carrier cell are the same, notify the second information element setting unit;

the second information element setting unit is configured to: set the power offset into the information element of the power offset information of the secondary common pilot channel of the single carrier cell, and set the information element of the power offset information of the secondary common pilot channel of the primary carrier cell and the information element of the power offset information of the secondary common pilot channel of the secondary carrier cell all as null;

the setting module further comprises a third judgment unit and a third information element setting unit, and the third judgment unit is configured to: when judging that both the target primary and secondary carrier cells use the MIMO pilot mode of the primary and secondary common pilot channels in the downlink direction, and the power offset of the secondary common pilot channel of the target primary carrier cell and the power offset of the secondary common pilot channel of the target secondary carrier cell are different, notify the third information element setting unit;

the third information element setting unit is configured to: set the information element of the power offset information of the secondary common pilot channel of the single carrier cell as null, set the power offset of the secondary common pilot channel of the target primary carrier cell into the information element of the power offset information of the secondary common pilot channel of the primary carrier cell, and set the power offset of the secondary common pilot channel of the target secondary carrier cell into the information element of the power offset information of the secondary common pilot channel of the secondary carrier cell;

the setting module further comprises a fourth judgment unit and a fourth information element setting unit, and the fourth judgment unit is configured to: when judging that the target primary carrier cell uses the MIMO pilot mode of the primary and secondary common pilot channels in the downlink direction, and the target secondary carrier cell does not use the MIMO pilot mode of the primary and secondary common pilot channels in the downlink direction, notify the fourth information element setting unit;

the fourth information element setting unit is configured to: set the information element of the power offset information of the secondary common pilot channel of the single carrier cell as null, set the power offset of the secondary common pilot channel of the target primary carrier cell into the information element of the power offset information of the secondary common pilot channel of the primary carrier cell, and set the information element of the power offset information of the secondary common pilot channel of the target secondary carrier cell as null;

the setting module further comprises a fifth judgment unit and a fifth information element setting unit, wherein, the fifth judgment unit is configured to: when judging that the target primary carrier cell does not use the MIMO pilot mode of the primary and secondary common pilot channels in the downlink direction, and the target secondary carrier cell uses the MIMO pilot mode of the primary and secondary common pilot channels in the downlink direction, notify the fifth information element setting unit;

the fifth information element setting unit is configured to: set the information element of the power offset information of the secondary common pilot channel of the single carrier cell as null, set the information element of the power offset information of the secondary common pilot channel of the primary carrier cell as null, and set the power offset of the secondary common pilot channel of the target secondary carrier cell into the information element of the power offset information of the secondary common pilot channel of the secondary carrier cell.

In order to solve the above-mentioned technical problem, the present document further provides a radio network control for receiving power offset information of a secondary common pilot channel, wherein, the radio network control acts as a serving radio network control, and the radio network control comprises a requesting module, a receiving module and a judgment module, the requesting unit is configured to: when a terminal prepares to move across an interconnection interface (IUR) between radio network controls, send request information to the drift radio network control, wherein, the request information is used for requesting the drift radio network control to feed back power offset information of respective secondary common pilot channels of target primary and secondary carrier cells managed by the drift radio network control;

the receiving unit is configured to: receive an information element of power offset information of a secondary common pilot channel of a single carrier cell, an information element of power offset information of a secondary common pilot channel of a primary carrier cell, and an information element of power offset information of a secondary common pilot channel of a secondary carrier cell fed back by the drift radio network control through the IUR;

the judging unit is configured to: after the receiving unit receives the information element, determine multiple-input multiple output pilot mode used by a target primary carrier cell and/or a secondary carrier cell, and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element.

In the radio network control of the present document, the radio network control is an old version of the serving radio network control, that is, a serving radio network control which only can identify the information element of the power offset information of the secondary common pilot channel of the single carrier cell;

the judgment unit is configured to:

when judging that the information element of the power offset information of the secondary common pilot channel of the single carrier cell is null, determine that both the target primary carrier cell and the target secondary carrier cell do not use the MIMO pilot mode of the primary and secondary common pilot channels in a downlink direction;

when judging that the information element of the power offset information of the secondary common pilot channel of the single carrier cell is not null, determine that both the target primary carrier cell and the target secondary carrier cell use the MIMO pilot mode of the primary and secondary common pilot channels in the downlink direction, and the power offset of the secondary common pilot channel of the target primary carrier cell and the power offset of the secondary common pilot channel of the target secondary carrier cell are the same, which all equal to a value of the information element of the power offset information of the secondary common pilot channel of the single carrier cell.

In the radio network control of the present document, the serving radio network control is a new version of the serving radio network control, that is, the serving radio network control which can identify following information elements: the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell;

the judgment unit is configured to:

when judging that the information element of the power offset information of the secondary common pilot channel of the single carrier cell is not null, determine that both the target primary carrier cell and the target secondary carrier cell use the MIMO pilot mode of the primary and secondary common pilot channels in the downlink direction, and the power offset of the secondary common pilot channel of the target primary carrier cell and the power offset of the secondary common pilot channel of the target secondary carrier cell are the same, which all equal to a value of the information element of the power offset information of the secondary common pilot channel of the single carrier cell;

when judging that the information element of the power offset information of the secondary common pilot channel of the single carrier cell is null and the information element of the power offset information of the secondary common pilot channel of the primary carrier cell is not null, determine that the target primary carrier cell uses the MIMO pilot mode of the primary and secondary common pilot channels in the downlink direction, and a value of the power offset of the secondary common pilot channel of the target primary carrier cell equals to a value of the information element of the power offset information of the secondary common pilot channel of the primary carrier cell;

when judging that the information element of the power offset information of the secondary common pilot channel of the single carrier cell is null and the information element of the power offset information of the secondary common pilot channel of the primary carrier cell is null, determine that the target primary carrier cell does not use the MIMO pilot mode of the primary and secondary common pilot channels in the downlink direction;

when judging that the information element of the power offset information of the secondary common pilot channel of the single carrier cell is null, and the information element of the power offset information of the secondary common pilot channel of the secondary carrier cell is not null, determine that the target secondary carrier cell uses the MIMO pilot mode of the primary and secondary common pilot channels in the downlink direction and a value of the power offset of the secondary common pilot channel of the target secondary carrier cell equals to a value of the information element of the power offset information of the secondary common pilot channel of the secondary carrier cell;

when judging that the information element of the power offset information of the secondary common pilot channel of the single carrier cell is null and the information element of the power offset information of the secondary common pilot channel of the secondary carrier cell is null, determine that the target secondary carrier cell does not use the MIMO pilot mode of the primary and secondary common pilot channels in the downlink direction.

For the old version of the radio network control, for the situation that both the primary carrier cell and the secondary carrier cell use the MIMO pilot mode of "the primary and secondary common pilot channels" in the downlink direction, and the power offset of the secondary common pilot channel of the primary carrier cell and the power offset of the secondary common pilot channel of the secondary carrier cell are the same, and for the situation that both the primary carrier cell and the secondary carrier cell do not use the MIMO pilot mode of "the primary and secondary common pilot channels" in the downlink direction, the embodiments of the present document can obtain the accurate information through the IUR interface, to solve the defect that the old version of the radio network control cannot obtain any information in the related art. For the situation that the primary and secondary carrier cells use different MIMO pilot modes or different power offsets in the same MIMO pilot mode, the embodiments of the present document adopt a conservative strategy which is resolved as that both the primary carrier cell and the secondary carrier cell do not use the MIMO pilot mode of "the primary and secondary common pilot channels" in the downlink direction, in such a way, although the best performance cannot be achieved, it can act as a safety choice of a baseline.

For the new version of the radio network control, when resolving the power offset information, the embodiments of the present document transmit the same MIMO information of the primary and secondary carrier cells by using the information element of the power offset information of the secondary common pilot channel of the single carrier cell, such that the processing action of the old version of the radio network control for that part is consistent.

PREFERRED EMBODIMENTS OF THE INVENTION

Figure 1:
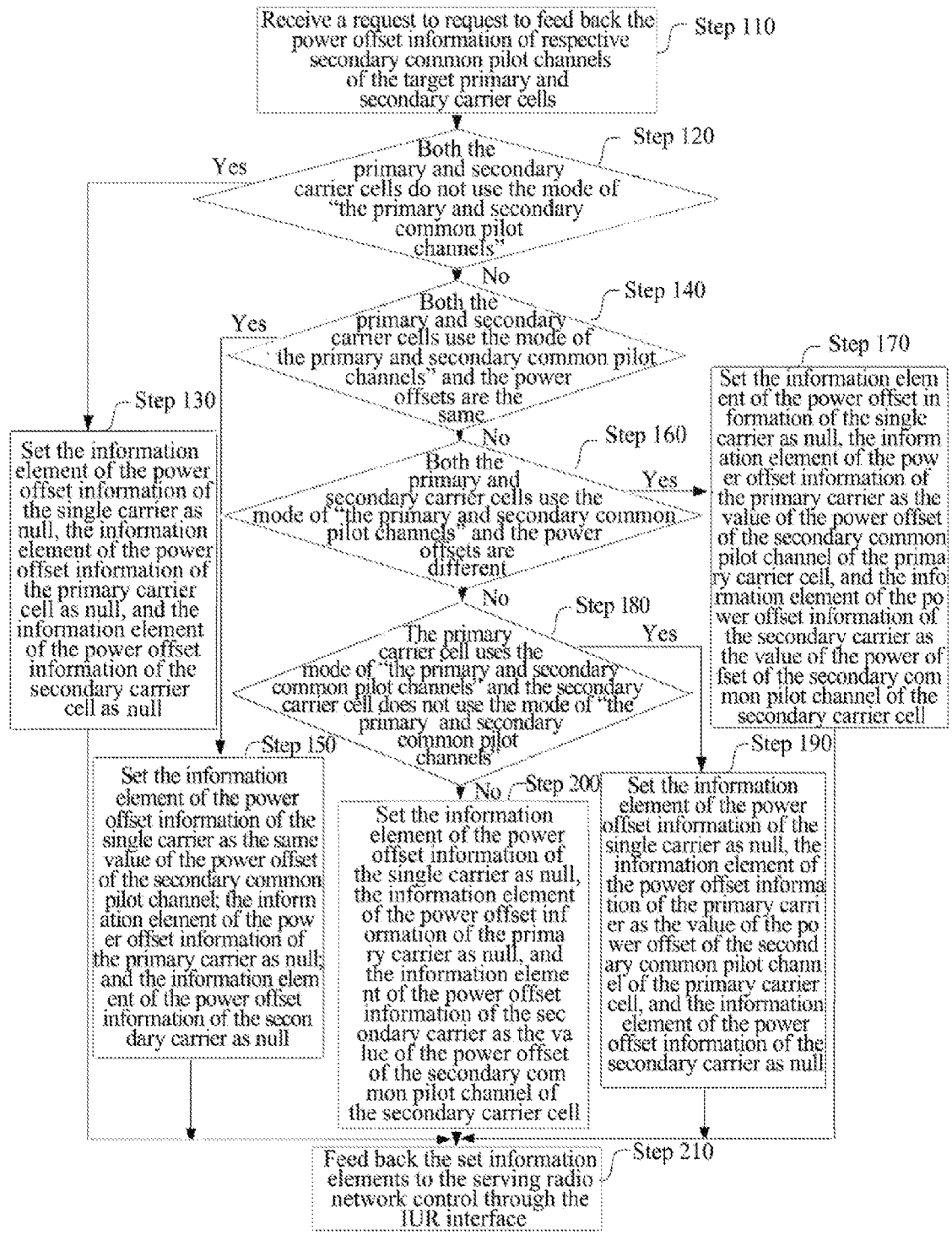
FIG. 1 is a diagram of a processing procedure according to embodiment one of the present document.

By resolving the related art, the phenomenon will be found that parts of serving radio network controls cannot resolve power offset information of respective secondary common pilot channels of primary and secondary carrier cells all the time, it is because there are two versions of the serving radio network controls supporting the multi-carrier high-speed downlink packet access technique operation:

an old version of the serving radio network control, that is, a radio network control which can identify an information element of power offset information of the secondary common pilot channel of a single carrier cell fed back by a drift radio network control only on an IUR interface; such as, an R8 and a former version of the serving radio network control;

a new version of the serving radio network control, that is, a radio network control which can identify the information elements of the power offset information of the respective secondary common pilot channels of the primary and secondary carrier cells, and the information element of the power offset information of the secondary common pilot channel of the single carrier cell fed back by the drift radio network control on an IUR interface; such as, an R9 and a former version of the serving radio network control.

From a point of view of an information element transferred by the IUR interface, there are 3 kinds of information elements: power offset information of the secondary common pilot channel of the single carrier cell, power offset information of the secondary common pilot channel of the primary carrier cell, and power offset information of the secondary common pilot channel of the secondary carrier cell. Those 3 kinds of information elements can be set by the drift radio network control, and fed back to the serving radio network control through the IUR interface. While the old version of the serving radio network control can only identify the one kind of information element, the power offset information of the secondary common pilot channel of the single carrier cell, which is received from the IUR interface; and only the new version of the serving radio network control can identify those 3 kinds of information elements received from the IUR interface.

Due to that the drift radio network control cannot know whether the serving radio network control is a new version or an old version, in the process of "the serving radio network control needs to request the drift radio network control to feed back the power offset information of respective secondary common pilot channels of the target primary and secondary carrier cells managed by the drift radio network control to the serving radio network control through the IUR interface", the drift radio network control might set the power offset information of respective secondary common pilot channels of the primary and secondary carrier cells into the two kinds of information elements, i.e. into the power offset information of the secondary common pilot channel of the primary carrier cell and the power offset information of the secondary common pilot channel of the secondary carrier cell, and sets the information element of the power offset information of the secondary common pilot channel of the single carrier cell as null, and feeds back those three kinds of information elements to the serving radio network control through the IUR interface.

While due to the above-mentioned difference of the new and old versions of the serving radio network controls, only the new version of the serving radio network control can receive and identify the two kinds of information elements through the IUR interface, that is, the power offset information of the secondary common pilot channel of the primary carrier cell and the power offset information of the secondary common pilot channel of the secondary carrier cell, and resolves the correct the power offset information of respective secondary common pilot channels of the primary and secondary carrier cells. While the old version of the serving radio network control receives the information element through the IUR interface, that is, the power offset information of the secondary common pilot channel of the single carrier cell which only can be identified, and the information element is null, therefore, the old version of the serving radio network control cannot resolve the power offset information of respective secondary common pilot channels of the primary and secondary carrier cells all the time.

In order to make the object, technical scheme and advantage of the present document more clear, the embodiments of the present document are described in detail with reference to the accompanying drawings hereinafter. It should be illustrated that, in the case of not conflicting, the embodiments in the present application and features thereof can be combined with each other.

In order to solve the problem existed in the related art, the embodiments of the present document consider to adopt the following schemes to transmit the power offset information of the secondary common pilot channel, wherein:

the drift radio network control receives the request information sent by the serving radio network control and used for requesting the drift radio network control to feed back the power offset information of respective secondary common pilot channels of the target primary and secondary carrier cells managed by the drift radio network control, the drift radio network control sets the following information elements with reference to the MIMO pilot modes used by the target primary and secondary carrier cells respectively: the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell, and feeds back the set information element to the serving radio network control through the IUR interface.

The primary and secondary carrier cells described in this text refer to a primary carrier cell and a secondary carrier cell.

Specifically, the processing procedure of the drift radio network control setting and transmitting the power offset information of the secondary common pilot channel is as follows:

in step one, when a terminal prepares to move across the IUR interface and hand over from the source primary and secondary carrier cells managed by the serving radio network control to the target primary and secondary carrier cells managed by the drift radio network control, the drift radio network control receives a request from the serving radio network control through the IUR interface, to request the drift radio network control to feed back the power offset information of respective secondary common pilot channels of the target primary and secondary carrier cells managed by the drift radio network control.

The request at least includes, a cell identify of the target primary carrier cell, a cell identify of the target secondary carrier cell, and an indication for requesting the power offset information of the secondary common pilot channel. In other embodiments, the indication for requesting the power offset information of the secondary common pilot channel also can be set respectively aiming at the target primary and secondary carrier cells.

If there is no specific description hereinafter, the primary carrier cell refers to a target primary carrier cell, and the secondary carrier cell refers to a target secondary carrier cell.

In step two, the drift radio network control sets the information element by judging the situation of the primary and secondary carrier cells indicated by the cell identifies, which specifically includes the following:

when the drift radio network control judges that the primary carrier cell does not use the MIMO pilot mode of "the primary and secondary common pilot channels" in the downlink direction, and the secondary carrier cell does not use the MIMO pilot mode of "the primary and secondary common pilot channels" in the downlink direction, then the drift radio network control set the three kinds of information elements as null, that is, the power offset information of the secondary common pilot channel of the single carrier cell, the power offset information of the secondary common pilot channel of the primary carrier cell, and the power offset information of the secondary common pilot channel of the secondary carrier cell.

When the drift radio network control judges that the primary carrier cell uses the MIMO pilot mode of "the primary and secondary common pilot channels" in the downlink direction, and the secondary carrier cell uses the MIMO pilot mode of "the primary and secondary common pilot channels" in the downlink direction, and the power offset of the secondary common pilot channel of the primary carrier cell and the power offset of the secondary common pilot channel of the secondary carrier cell are the same, then the drift radio network control sets the power offset into this information element of the power offset information of the secondary common pilot channel of the single carrier cell, and sets the two kinds of information elements, i.e. the power offset information of the secondary common pilot channel of the primary carrier cell and the power offset information of the secondary common pilot channel of the secondary carrier cell, as null;

when the drift radio network control judges that the primary carrier cell uses the MIMO pilot mode of "the primary and secondary common pilot channels" in the downlink direction, and the secondary carrier cell uses the MIMO pilot mode of "the primary and secondary common pilot channels" in the downlink direction, and the power offset of the secondary common pilot channel of the primary carrier cell and the power offset of the secondary common pilot channel of the secondary carrier cell are different, then the drift radio network control sets the information element of the power offset information of the secondary common pilot channel of the single carrier cell as null, sets the power offset of the secondary common pilot channel of the primary carrier cell into the information element of the power offset information of the secondary common pilot channel of the primary carrier cell, and sets the power offset of the secondary common pilot channel of the secondary carrier cell into the information element of the power offset information of the secondary common pilot channel of the secondary carrier cell.

When the drift radio network control judges that the primary carrier cell uses the MIMO pilot mode of "the primary and secondary common pilot channels" in the downlink direction, and the secondary carrier cell does not the MIMO pilot mode of "the primary and secondary common pilot channels" in the downlink direction, then the drift radio network control sets the information element of the power offset information of the secondary common pilot channel of the single carrier cell as null, sets the power offset of the secondary common pilot channel of the primary carrier cell into the information element of the power offset information of the secondary common pilot channel of the primary carrier cell, and sets the information element of the power offset information of the secondary common pilot channel of the secondary carrier cell as null.

When the drift radio network control judges that the primary carrier cell does not use the MIMO pilot mode of "the primary and secondary common pilot channels" in the downlink direction, and the secondary carrier cell uses the MIMO pilot mode of "the primary and secondary common pilot channels" in the downlink direction, then the drift radio network control sets the information element of the power offset information of the secondary common pilot channel of the single carrier cell as null, sets the information element of the power offset information of the secondary common pilot channel of the primary carrier cell as null, and sets the power offset of the secondary common pilot channel of the secondary carrier cell into the information element of the power offset information of the secondary common pilot channel of the secondary carrier cell.

In step three, the drift radio network control feeds back the set information element to the serving radio network control through the IUR interface.

In the present embodiment, the method for receiving the power offset information of the secondary common pilot channel includes the following steps:

when the terminal prepares to move across the IUR interface, the serving radio network control to which the terminal belongs sends the request information to the drift radio network control, wherein, the request information is used for requesting the drift radio network control to feed back the power offset information of respective secondary common pilot channels of the target primary and secondary carrier cells managed by the drift radio network control;

the serving radio network control, after receiving the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell fed back by the drift radio network control through the IUR interface, determines the MIMO pilot mode used by the target primary carrier cell and/or secondary carrier cell, and the power offset information of the secondary common pilot channel corresponding to the MIMO pilot modes when the target primary carrier cell and/or secondary carrier cell uses the MIMO pilot mode of the primary and secondary common pilot channels, according to the contents carried in the information element.

When determining that the MIMO pilot mode used by the target primary carrier cell and/or secondary carrier cell is the MIMO pilot mode of the primary and secondary common pilot channels, the content in the corresponding information element is the power offset information of the secondary common pilot channel corresponding to the MIMO pilot mode.

Aiming at the old version of the serving radio network control and the new version of the serving radio network control, the methods of receiving and resolving the power offset information of the secondary common pilot channel have their respective processing procedures.

Specifically, the processing procedure of the old version of the serving radio network control receiving and resolving the power offset information of the secondary common pilot channel is as follows:

in step one, when the terminal prepares to move across the IUR interface and hand over from the source primary and secondary carrier cells managed by the serving radio network control to the target primary and secondary carrier cells managed by the drift radio network control, the serving radio network control sends a request to the drift radio network control through the IUR interface to request the drift radio network control to feed back the power offset information of respective secondary common pilot channels of the target primary and secondary carrier cells managed by the drift radio network control.

The request specifically includes: the cell identify of the primary carrier cell, the cell identify of the secondary carrier cell, and the indication for requesting the power offset information of the secondary common pilot channel. In other embodiments, the indication for requesting the power offset information of the secondary common pilot channel can also be set respectively aiming at the target primary and secondary carrier cells.

In step two, the serving radio network control receives the power offset information of the respective secondary common pilot channels of the target primary and secondary carrier cells managed by the drift radio network control fed back by the drift radio network control, and performs resolving through the IUR interface, which includes the following steps specifically:

when the information element of the power offset information of the secondary common pilot channel of the single carrier cell is null, the serving radio network control resolves that both the primary carrier cell and the secondary carrier cell do not use the MIMO pilot mode of "the primary and secondary common pilot channels" in the downlink direction;

when the information element of the power offset information of the secondary common pilot channel of the single carrier cell is null, the serving radio network control resolves that both the primary carrier cell and the secondary carrier cell use the MIMO pilot mode of "the primary and secondary common pilot channels" in the downlink direction, and the power offset of the secondary common pilot channel of the primary carrier cell and the power offset of the secondary common pilot channel of the secondary carrier cell are the same, then the values of both the power offset of the secondary common pilot channel of the primary carrier cell and the power offset of the secondary common pilot channel of the secondary carrier cell equal to the value of the information element of the power offset information of the secondary common pilot channel of the single carrier cell.

Specifically, the processing procedure of the new version of the serving radio network control receiving and resolving the power offset information of the secondary common pilot channel is as follows:

in step one, when the terminal prepares to move across the IUR interface and hand over from the source primary and secondary carrier cells managed by the serving radio network control to the target primary and secondary carrier cells managed by the drift radio network control, the serving radio network control send the request to the drift radio network control through the IUR interface to request the drift radio network control to feed back the power offset information of respective secondary common pilot channels of the target primary and secondary carrier cells managed by the drift radio network control.

The request specifically includes: the cell identify of the primary carrier cell, the cell identify of the secondary carrier cell, and the indication for requesting the power offset information of the secondary common pilot channel. In other embodiments, the indication for requesting the power offset information of the secondary common pilot channel can also be set respectively aiming at the target primary and secondary carrier cells.

In step two, the serving radio network control receives the power offset information of the respective secondary common pilot channels of the target primary and secondary carrier cells managed by the drift radio network control fed back by the drift radio network control, and performs resolving through the IUR interface, which includes the following steps specifically:

when the information element of the power offset information of the secondary common pilot channel of the single carrier cell is not null, the serving radio network control resolves that both the primary carrier cell and the secondary carrier cell use the MIMO pilot mode of "the primary and secondary common pilot channels" in the downlink direction, and the power offset of the secondary common pilot channel of the primary carrier cell and the power offset of the secondary common pilot channel of the secondary carrier cell are the same, then the values of both the power offset of the secondary common pilot channel of the primary carrier cell and the power offset of the secondary common pilot channel of the secondary carrier cell equal to the value of the information element of the power offset information of the secondary common pilot channel of the single carrier cell.

When the information element of the power offset information of the secondary common pilot channel of the single carrier cell is null, and if the information element of the power offset information of the secondary common pilot channel of the primary carrier cell is not null, then the serving radio network control resolves that the primary carrier cell uses the MIMO pilot mode of "the primary and secondary common pilot channels" in the downlink direction, and the value of the power offset of the secondary common pilot channel of the primary carrier cell equals to the value of the information element of the power offset information of the secondary common pilot channel of the primary carrier cell; if the information element of the power offset information of the secondary common pilot channel of the primary carrier cell is null, then the serving radio network control resolves that the primary carrier cell does not use the MIMO pilot mode of "the primary and secondary common pilot channels" in the downlink direction. If the information element of the power offset information of the secondary common pilot channel of the secondary carrier cell is not null, then the serving radio network control resolves that the secondary carrier cell uses the MIMO pilot mode of "the primary and secondary common pilot channels" in the downlink direction, and the value of the power offset of the secondary common pilot channel of the secondary carrier cell equals to the value of the information element of the power offset information of the secondary common pilot channel of the secondary carrier cell; if the information element of the power offset information of the secondary common pilot channel of the secondary carrier cell is null, then the serving radio network control resolves that the secondary carrier cell does not use the MIMO pilot mode of "the primary and secondary common pilot channels" in the downlink direction.

The implementation of the technical scheme in the present document is further described in detail combining with the accompanying drawings hereinafter.

Embodiment One

The present embodiment provides an example of the processing procedure of the drift radio network control setting and transmitting the power offset information of the secondary common pilot channel when the terminal prepares to move across the IUR interface and hand overs from the source primary and secondary carrier cells managed by the serving radio network control to the target primary and secondary carrier cells managed by the drift radio network control, as shown in FIG. 1; each step is as follows:

in step 110, the drift radio network control receives the request from the serving radio network control through the IUR interface, to request the drift radio network control to feed back the power offset information of respective secondary common pilot channels of the target primary and secondary carrier cells managed by the drift radio network control;

in the present embodiment, the request includes: the cell identify of the primary carrier cell, the cell identify of the secondary carrier cell, and the indication for requesting the power offset information of the secondary common pilot channel.

in step 120, the drift radio network control judges whether the following condition 1 is satisfied according to the situation of the primary and secondary carrier cells indicated by the cell identifies; if yes, it is to proceed to step 130; and if not, it is to proceed to step 140;

condition 1: the primary carrier cell does not use the MIMO pilot mode of "the primary and secondary common pilot channels" in the downlink direction, and the secondary carrier cell does not use the MIMO pilot mode of "the primary and secondary common pilot channels" in the downlink direction.

In step 130, the drift radio network control sets the three kinds of information elements, that is, the power offset information of the secondary common pilot channel of the single carrier cell, the power offset information of the secondary common pilot channel of the primary carrier cell, and the power offset information of the secondary common pilot channel of the secondary carrier cell as null, and it is to proceed to step 210;

In step 140, the drift radio network control judges whether the following condition 2 is satisfied according to the situation of the primary and secondary carrier cells indicated by the cell identifies; if yes, it is to proceed to step 150; and if not, it is to proceed to step 160;

condition 2: the primary carrier cell uses the MIMO pilot mode of "the primary and secondary common pilot channels" in the downlink direction, and the secondary carrier cell uses the MIMO pilot mode of "the primary and secondary common pilot channels" in the downlink direction, and the power offset of the secondary common pilot channel of the primary carrier cell and the power offset of the secondary common pilot channel of the secondary carrier cell are the same.

In step 150, the drift radio network control sets the same power offset (the power offset of the secondary common pilot channel of the primary carrier cell and the power offset of the secondary common pilot channel of the secondary carrier cell) into the information element of the power offset information of the secondary common pilot channel of the single carrier cell, and sets the two kinds of information elements, that is, the power offset information of the secondary common pilot channel of the primary carrier cell and the power offset information of the secondary common pilot channel of the secondary carrier cell as null, and it is to proceed to step 210;

In step 160, the drift radio network control judges whether the following condition 3 is satisfied according to the situation of the primary and secondary carrier cells indicated by the cell identifies; if yes, then it is to proceed to step 170; and if not, then it is to proceed to step 180;

condition 3: the primary carrier cell uses the MIMO pilot mode of "the primary and secondary common pilot channels" in the downlink direction, and the secondary carrier cell uses the MIMO pilot mode of "the primary and secondary common pilot channels" in the downlink direction, and the power offset of the secondary common pilot channel of the primary carrier cell and the power offset of the secondary common pilot channel of the secondary carrier cell are different.

In step 170, the drift radio network control sets the information element of the power offset information of the secondary common pilot channel of the single carrier cell as null, sets the power offset of the secondary common pilot channel of the primary carrier cell into the information element of the power offset information of the secondary common pilot channel of the primary carrier cell, and sets the power offset of the secondary common pilot channel of the secondary carrier cell into the information element of the power offset information of the secondary common pilot channel of the secondary carrier cell, and it is to proceed to step 210;

In step 180, the drift radio network control judges whether the following condition 4 is satisfied according to the situation of the primary and secondary carrier cells indicated by the cell identifies; if yes, then it is to proceed to step 190; and if not, then it is to proceed to step 200;

condition 4: the primary carrier cell uses the MIMO pilot mode of "the primary and secondary common pilot channels" in the downlink direction, and the secondary carrier cell does not use the MIMO pilot mode of "the primary and secondary common pilot channels" in the downlink direction.

In step 190, the drift radio network control sets the information element of the power offset information of the secondary common pilot channel of the single carrier cell as null, sets the power offset of the secondary common pilot channel of the primary carrier cell into the information element of the power offset information of the secondary common pilot channel of the primary carrier cell, and sets the information element of the power offset information of the secondary common pilot channel of the secondary carrier cell as null, and it is to proceed to step 210;

In step 200, the drift radio network control sets the information element of the power offset information of the secondary common pilot channel of the single carrier cell as null, sets the information element of the power offset information of the secondary common pilot channel of the primary carrier cell as null, and sets the power offset of the secondary common pilot channel of the secondary carrier cell into the information element of the power offset information of the secondary common pilot channel of the secondary carrier cell, and it is to proceed to step 210;

This step will be entered only in the following situation: the primary carrier cell does not use the MIMO pilot mode of "the primary and secondary common pilot channels" in the downlink direction, and the secondary carrier cell uses the MIMO pilot mode of "the primary and secondary common pilot channels" in the downlink direction.

In step 210, the drift radio network control feeds back the set information elements to the serving radio network control through the IUR interface, and the procedure ends.

Embodiment Two

Figure 2:
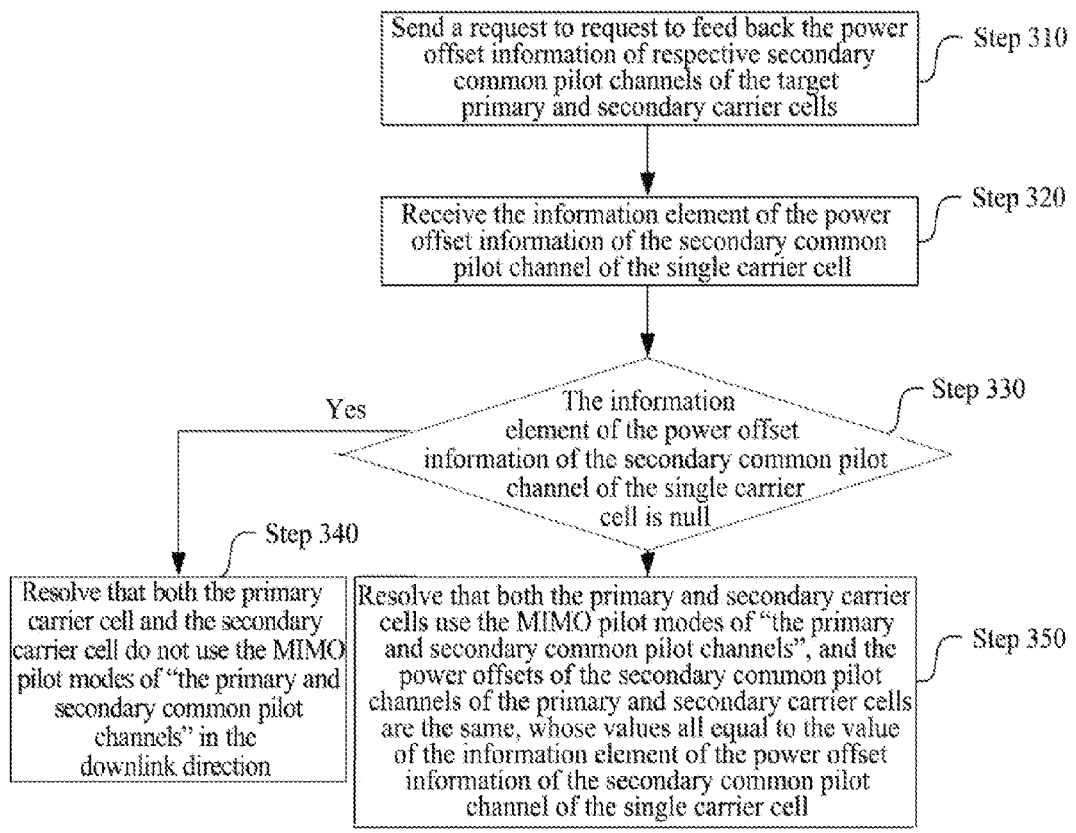
FIG. 2 is a diagram of a processing procedure according to embodiment two of the present document.

The present embodiment provides an example of the processing procedure of the old version of the serving radio network control receiving and resolving the power offset information of the secondary common pilot channel when the terminal prepares to move across the IUR interface and hand over from the source primary and secondary carrier cells managed by the serving radio network control to the target primary and secondary carrier cells managed by the drift radio network control, as shown in FIG. 2; each step is as follows:

in step 310, the serving radio network control sends the request to the drift radio network control through the IUR interface, to request the drift radio network control to feed back the power offset information of respective secondary common pilot channels of the target primary and secondary carrier cells managed by the drift radio network control;

in the present embodiment, the request especially includes: the cell identify of the primary carrier cell, the cell identify of the secondary carrier cell, and the indication for requesting the power offset information of the secondary common pilot channel.

In step 320, the serving radio network control receives the information element of the power offset information of the secondary common pilot channel of the single carrier cell of the power offset information of respective secondary common pilot channels of the target primary and secondary carrier cells managed by the drift radio network control fed back by the drift radio network control, through the IUR interface;

in step 330, the serving radio network control resolves the received information element of the power offset information of the secondary common pilot channel of the single carrier cell, and judges whether the following condition is satisfied: the information element of the power offset information of the secondary common pilot channel of the single carrier cell is null; if yes, then it is to proceed to step 340; and if not (this branch is the situation "when the information element of the power offset information of the secondary common pilot channel of the single carrier cell is not null"), and then it is to proceed to step 350;

in step 340, the serving radio network control resolves that both the primary carrier cell and the secondary carrier cell do not use the MIMO pilot mode of "the primary and secondary common pilot channels" in the downlink direction, and the procedure ends;

in step 350, the serving radio network control resolves that both the primary carrier cell and secondary carrier cell use the MIMO pilot mode of "the primary and secondary common pilot channels" in the downlink direction, and the power offset of the secondary common pilot channel of the primary carrier cell and the power offset of the secondary common pilot channel of the secondary carrier cell are the same, and the values of both the power offset of the secondary common pilot channel of the primary carrier cell and the power offset of the secondary common pilot channel of the secondary carrier cell equal to the value of the information element of the power offset information of the secondary common pilot channel of the single carrier cell, and the procedure ends.

In the present embodiment, the old version of the serving radio network control refers to the serving radio network control which only can receive and identify the power offset information of the secondary common pilot channel of the target single carrier cell managed by the drift radio network control fed back by the drift radio network control on the IUR interface.

Embodiment Three

Figure 3:
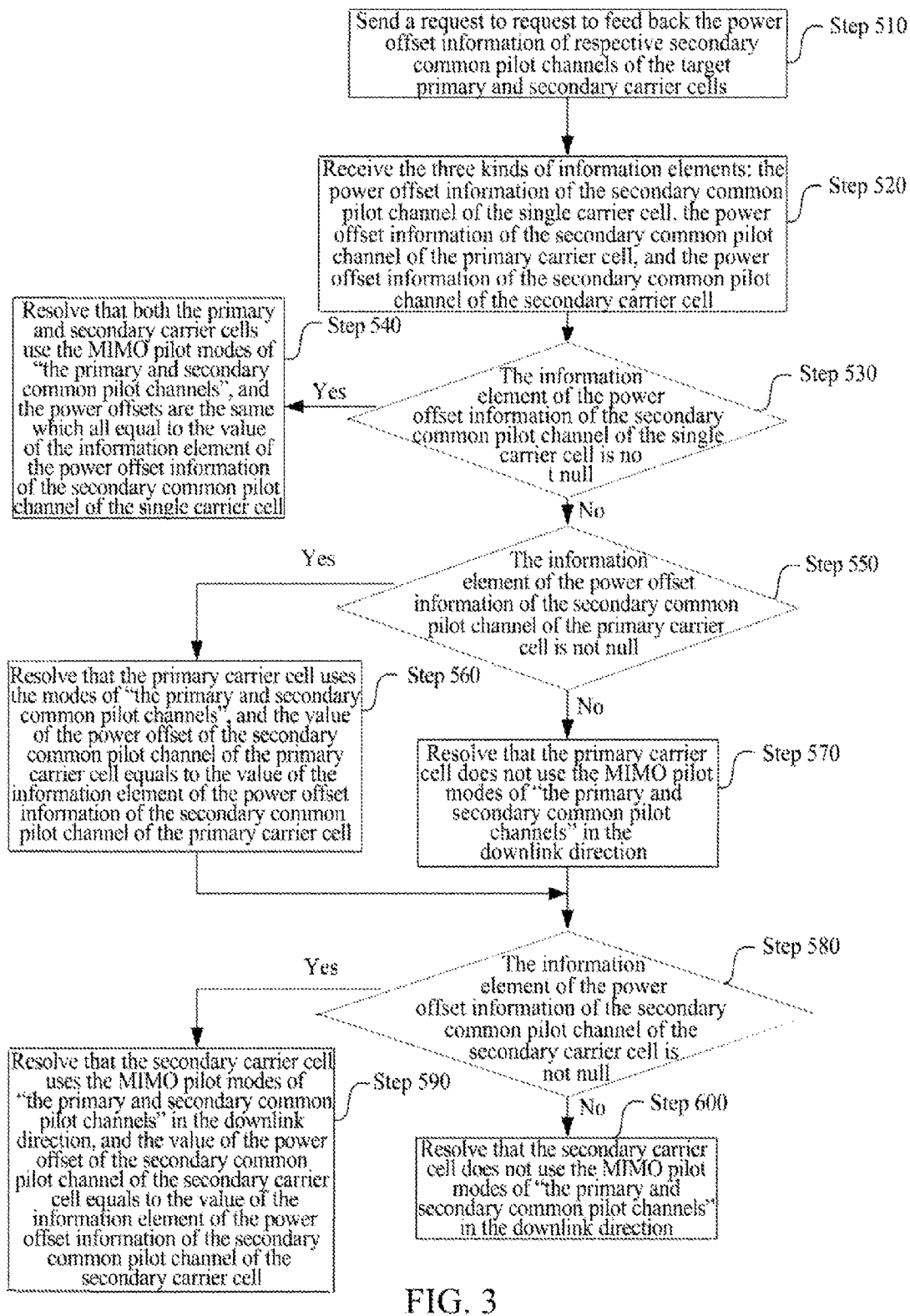
FIG. 3 is a diagram of a processing procedure according to embodiment three of the present document.

The present embodiment provides an example of the processing procedure of the old version of the serving radio network control receiving and resolving the power offset information of the secondary common pilot channel when the terminal prepares to move across the IUR interface and hand over from the source primary and secondary carrier cells managed by the serving radio network control to the target primary and secondary carrier cells managed by the drift radio network control, as shown in FIG. 3; each step is as follows:

in step 510, the serving radio network control sends the request to the drift radio network control through the IUR interface, to request the drift radio network control to feed back the power offset information of respective secondary common pilot channels of the target primary and secondary carrier cells managed by the drift radio network control;

in the present embodiment, the request especially includes: the cell identify of the primary carrier cell, the cell identify of the secondary carrier cell, and the indication for requesting the power offset information of the secondary common pilot channel.

in step 520, the serving radio network control receives the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell fed back by the drift radio network control through the IUR interface;

in step 530, the serving radio network control resolves the three kinds of above-mentioned received information elements, and judges whether the following condition is satisfied: the information element of the power offset information of the secondary common pilot channel of the single carrier cell is un-null; if yes, then it is to proceed to step 540; and if not (this branch is the situation that "the information element of the power offset information of the secondary common pilot channel of the single carrier cell is null"), then it is to proceed to step 550;

in step 540, the serving radio network control resolves that both the primary carrier cell and the secondary carrier cell use the MIMO pilot mode of "the primary and secondary common pilot channels" in the downlink direction, and the power offset of the secondary common pilot channel of the primary carrier cell and the power offset of the secondary common pilot channel of the secondary carrier cell are the same, and the values of both the power offset of the secondary common pilot channel of the primary carrier cell and the power offset of the secondary common pilot channel of the secondary carrier cell equal to the value of the information element of the power offset information of the secondary common pilot channel of the single carrier cell, and the procedure ends;

in step 550, the serving radio network control continues to judge whether the following condition is satisfied: the information element of the power offset information of the secondary common pilot channel of the primary carrier cell is un-null; if yes, then it is to proceed to step 560; and if not (this branch is the situation that "the information element of the power offset information of the secondary common pilot channel of the primary carrier cell is null"), then it is to proceed to step 570;

in step 560, the serving radio network control resolves that the primary carrier cell uses the MIMO pilot mode of "the primary and secondary common pilot channels" in the downlink direction, and the value of the power offset of the secondary common pilot channel of the primary carrier cell equals to the value of the information element of the power offset information of the secondary common pilot channel of the primary carrier cell, and it is to proceed to step 580;

in step 570, the serving radio network control resolves that the primary carrier cell does not use the MIMO pilot mode of "the primary and secondary common pilot channels" in the downlink direction, and it is to proceed to step 580;

in step 580, the serving radio network control continues to judge whether the following condition is satisfied: the information element of the power offset information of the secondary common pilot channel of the secondary carrier cell is un-null; if yes, then it is to proceed to step 590; and if not (this branch is the situation that "the information element of the power offset information of the secondary common pilot channel of the secondary carrier cell is null), then it is to proceed to step 600;

in step 590, the serving radio network control resolves that the secondary carrier cell uses the MIMO pilot mode of "the primary and secondary common pilot channels" in the downlink direction, and the value of the power offset of the secondary common pilot channel of the secondary carrier cell equals to the value of the information element of the power offset information of the secondary common pilot channel of the secondary carrier cell, and the procedure ends;

in step 600, the serving radio network control resolves that the secondary carrier cell does not use the MIMO pilot mode of "the primary and secondary common pilot channels" in the downlink direction, and the procedure ends.

In the present embodiment, the new version of the serving radio network control refers to the serving radio network control which can identify the power offset information of respective secondary common pilot channels of the target primary and secondary carrier cells managed by the drift radio network control and the power offset information of the secondary common pilot channel of the single carrier cell fed back by the drift radio network control on the IUR interface.

Embodiment Four

The present embodiment introduces a radio network control for transmitting power offset information of a secondary common pilot channel, the radio network control acts as a drift radio network control, and the radio network control includes a receiving module, a setting module and a sending module, wherein the receiving module is configured to receive request information sent by a serving radio network control, and the request information is used for requesting the drift radio network control to feed back power offset information of respective secondary common pilot channels of target primary and secondary carrier cells managed by the drift radio network control;

the setting module is configured to, after the receiving module receives the request information sent by the serving radio network control, set following information elements with reference to multiple-input multiple output (MIMO) pilot modes used respectively by the target primary and secondary carrier cells: an information element of power offset information of a secondary common pilot channel of a single carrier cell, an information element of power offset information of a secondary common pilot channel of a primary carrier cell, and an information element of power offset information of a secondary common pilot channel of a secondary carrier cell;

the sending module is configured to feed back the set information elements to the serving radio network control through an IUR interface.

Preferably, the setting module comprises a first judgment unit and a first information element setting unit, wherein the first judgment unit is configured to: when judging that both the target primary and secondary carrier cells do not use the MIMO pilot mode of the primary and secondary common pilot channels in a downlink direction, notify the first information element setting unit;

the first information element setting unit is configured to: set the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell all as null.

Preferably, the setting module further comprises a second judgment unit and a second information element setting unit, wherein, the second judgment unit is configured to: when judging that both the target primary and secondary carrier cells use the MIMO pilot mode of the primary and secondary common pilot channels in the downlink direction, and a power offset of the secondary common pilot channel of the target primary carrier cell and a power offset of the secondary common pilot channel of the target secondary carrier cell are the same, notify the second information element setting unit;

the second information element setting unit is configured to: set the power offset into the information element of the power offset information of the secondary common pilot channel of the single carrier cell, and set the information element of the power offset information of the secondary common pilot channel of the primary carrier cell and the information element of the power offset information of the secondary common pilot channel of the secondary carrier cell all as null.

Preferably, the setting module further comprises a third judgment unit and a third information element setting unit, and the third judgment unit is configured to: when judging that both the target primary and secondary carrier cells use the MIMO pilot mode of the primary and secondary common pilot channels in the downlink direction, and the power offset of the secondary common pilot channel of the target primary carrier cell and the power offset of the secondary common pilot channel of the target secondary carrier cell are different, notify the third information element setting unit;

the third information element setting unit is configured to: set the information element of the power offset information of the secondary common pilot channel of the single carrier cell as null, set the power offset of the secondary common pilot channel of the target primary carrier cell into the information element of the power offset information of the secondary common pilot channel of the primary carrier cell, and set the power offset of the secondary common pilot channel of the target secondary carrier cell into the information element of the power offset information of the secondary common pilot channel of the secondary carrier cell.

Preferably, the setting module further comprises a fourth judgment unit and a fourth information element setting unit, wherein the fifth judgment unit is configured to: when judging that the target primary carrier cell does not use the MIMO pilot mode of the primary and secondary common pilot channels in the downlink direction, and the target secondary carrier cell uses the MIMO pilot mode of the primary and secondary common pilot channels in the downlink direction, notify the fifth information element setting unit;

the fourth information element setting unit is configured to: set the information element of the power offset information of the secondary common pilot channel of the single carrier cell as null, set the power offset of the secondary common pilot channel of the target primary carrier cell into the information element of the power offset information of the secondary common pilot channel of the primary carrier cell, and set the information element of the power offset information of the secondary common pilot channel of the target secondary carrier cell as null.

Preferably, the setting module further comprises a fifth judgment unit and a fifth information element setting unit, wherein, the fourth judgment unit is configured to: when judging that the target primary carrier cell does not use the MIMO pilot mode of the primary and secondary common pilot channels in the downlink direction, and the target secondary carrier cell uses the MIMO pilot mode of the primary and secondary common pilot channels in the downlink direction, notify the fifth information element setting unit;

the fifth information element setting unit is configured to: set the information element of the power offset information of the secondary common pilot channel of the single carrier cell as null, set the information element of the power offset information of the secondary common pilot channel of the primary carrier cell as null, and set the power offset of the secondary common pilot channel of the target secondary carrier cell into the information element of the power offset information of the secondary common pilot channel of the secondary carrier cell.

Embodiment Five

The present embodiment introduces a radio network control for receiving power offset information of a secondary common pilot channel, the radio network control acts as a drift radio network control, and the radio network control includes a requesting module, a receiving module and a judgment module, wherein the requesting unit is configured to: when a terminal prepares to move across an interconnection interface (IUR), send request information to the drift radio network control, wherein, the request information is used for requesting the drift radio network control to feed back power offset information of respective secondary common pilot channels of target primary and secondary carrier cells managed by the drift radio network control;

the receiving unit is configured to: receive an information element of power offset information of a secondary common pilot channel of a single carrier cell, an information element of power offset information of a secondary common pilot channel of a primary carrier cell, and an information element of power offset information of a secondary common pilot channel of a secondary carrier cell fed back by the drift radio network control through the IUR;

the judging unit is configured to: after the receiving unit receives the information element, determine multiple-input multiple output pilot mode used by a target primary carrier cell and/or a secondary carrier cell, and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element.

Preferably, the radio network control is an old version of the serving radio network control, that is, a serving radio network control which only can identify the information element of the power offset information of the secondary common pilot channel of the single carrier cell;

now, the judgment unit is configured to:

when judging that the information element of the power offset information of the secondary common pilot channel of the single carrier cell is null, determine that both the target primary carrier cell and the target secondary carrier cell do not use the MIMO pilot mode of the primary and secondary common pilot channels in a downlink direction;

when judging that the information element of the power offset information of the secondary common pilot channel of the single carrier cell is not null, determine that both the target primary carrier cell and the target secondary carrier cell use the MIMO pilot mode of the primary and secondary common pilot channels in the downlink direction, and the power offset of the secondary common pilot channel of the target primary carrier cell and the power offset of the secondary common pilot channel of the target secondary carrier cell are the same, which all equal to a value of the information element of the power offset information of the secondary common pilot channel of the single carrier cell.

Preferably, the serving radio network control is a new version of the serving radio network control, that is, the serving radio network control which can identify following information elements: the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell;

now, the judgment unit is configured to:

when judging that the information element of the power offset information of the secondary common pilot channel of the single carrier cell is not null, determine that both the target primary carrier cell and the target secondary carrier cell use the MIMO pilot mode of the primary and secondary common pilot channels in the downlink direction, and the power offset of the secondary common pilot channel of the target primary carrier cell and the power offset of the secondary common pilot channel of the target secondary carrier cell are the same, which all equal to a value of the information element of the power offset information of the secondary common pilot channel of the single carrier cell;

when judging that the information element of the power offset information of the secondary common pilot channel of the single carrier cell is null and the information element of the power offset information of the secondary common pilot channel of the primary carrier cell is not null, determine that the target primary carrier cell uses the MIMO pilot mode of the primary and secondary common pilot channels in the downlink direction, and a value of the power offset of the secondary common pilot channel of the target primary carrier cell equals to a value of the information element of the power offset information of the secondary common pilot channel of the primary carrier cell;

when judging that the information element of the power offset information of the secondary common pilot channel of the single carrier cell is null and the information element of the power offset information of the secondary common pilot channel of the primary carrier cell is null, determine that the target primary carrier cell does not use the MIMO pilot mode of the primary and secondary common pilot channels in the downlink direction;

when judging that the information element of the power offset information of the secondary common pilot channel of the single carrier cell is null, and the information element of the power offset information of the secondary common pilot channel of the secondary carrier cell is not null, determine that the target secondary carrier cell uses the MIMO pilot mode of the primary and secondary common pilot channels in the downlink direction and a value of the power offset of the secondary common pilot channel of the target secondary carrier cell equals to a value of the information element of the power offset information of the secondary common pilot channel of the secondary carrier cell;

when judging that the information element of the power offset information of the secondary common pilot channel of the single carrier cell is null and the information element of the power offset information of the secondary common pilot channel of the secondary carrier cell is null, determine that the target secondary carrier cell does not use the MIMO pilot mode of the primary and secondary common pilot channels in the downlink direction.

It can be understood by those skilled in the art that all or part of steps in the above-mentioned method can be fulfilled by programs instructing the relevant hardware, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The present document can have a variety of other embodiments. Those skilled in the art can make corresponding modifications and variations according to the present document without departing from the spirit and essence of the present document. And all of these modifications or the variations should be embodied in the scope of the appending claims of the present document.

INDUSTRIAL APPLICABILITY

The present document enables all serving radio network controls to resolve the power offset information of the respective secondary common pilot channels of the primary and secondary carrier cells as far as possible.

I claim:

1. A method for transmitting power offset information of a secondary common pilot channel, comprising:
a drift radio network control receiving request information sent by a serving radio network control and used for requesting the drift radio network control to feed back power offset information of respective secondary common pilot channels of target primary and secondary carrier cells managed by the drift radio network control,
the drift radio network control setting following information elements with reference to multiple-input multiple-output (MIMO) pilot modes used respectively by the target primary and secondary carrier cells: an information element of power offset information of a secondary common pilot channel of a single carrier cell, an information element of power offset information of a secondary common pilot channel of a primary carrier cell, and an information element of power offset information of a secondary common pilot channel of a secondary carrier cell, and feeding back the set information elements to the serving radio network control through an interconnection interface between the radio network controls;
wherein, the MIMO pilot modes used respectively by the target primary and secondary carrier cells include: whether the target primary carrier cell uses the MIMO pilot mode of the primary and secondary common pilot channels in a downlink direction and whether the target secondary carrier cell uses the MIMO pilot mode of the primary and secondary common pilot channels in a downlink direction.

2. The method according to claim 1, wherein,
the step of the drift radio network control setting information elements with reference to MIMO pilot modes used respectively by the target primary and secondary carrier cells comprises:
when the drift radio network control judges that the target primary and secondary carrier cells do not use the MIMO pilot mode of the primary and secondary common pilot channels in a downlink direction, the drift radio network control setting the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell all as null.

3. The method according to claim 1, wherein,
the step of the drift radio network control setting information elements with reference to MIMO pilot modes used respectively by the target primary and secondary carrier cells comprises:
when the drift radio network control judges that the target primary and secondary carrier cells use the MIMO pilot mode of the primary and secondary common pilot channels in a downlink direction, and when a power offset of the secondary common pilot channel of the target primary carrier cell is the same with a power offset of the secondary common pilot channel of the target secondary carrier cell, the drift radio network control setting the power offset into the information element of the power offset information of the secondary common pilot channel of the single carrier cell, and setting both the information element of the power offset information of the secondary common pilot channel of the primary carrier cell and the information element of the power offset information of the secondary common pilot channel of the secondary carrier cell as null.

4. The method according to claim 1, wherein,
the step of the drift radio network control setting information elements with reference to MIMO pilot modes used respectively by the target primary and secondary carrier cells comprises:
when the drift radio network control judges that the target primary and secondary carrier cells use the MIMO pilot mode of the primary and secondary common pilot channels in a downlink direction, while a power offset of the secondary common pilot channel of the target primary carrier cell is different from a power offset of the secondary common pilot channel of the target secondary carrier cell, the drift radio network control setting the information element the power offset information of the secondary common pilot channel of the single carrier cell as null, setting the power offset of the secondary common pilot channel of the target primary carrier cell into the information element of the power offset information of the secondary common pilot channel of the primary carrier cell, and setting the power offset of the secondary common pilot channel of the target secondary carrier cell into the information element of the power offset information of the secondary common pilot channel of the secondary carrier cell.

5. The method according to claim 1, wherein,
the step of the drift radio network control setting information elements with reference to MIMO pilot modes used respectively by the target primary and secondary carrier cells comprises:
when the drift radio network control judges that the target primary carrier cell uses the MIMO pilot mode of the primary and secondary common pilot channels in a downlink direction, while the target secondary carrier cell does not use the MIMO pilot mode of the primary and secondary common pilot channels in the downlink direction, the drift radio network control setting the information element of the power offset information of the secondary common pilot channel of the single carrier cell as null, setting the power offset of the secondary common pilot channel of the target primary carrier cell into the information element of the power offset information of the secondary common pilot channel of the primary carrier cell, and setting the information element of the power offset information of the secondary common pilot channel of the target secondary carrier cell as null.

6. The method according to claim 1, wherein,
the step of the drift radio network control setting information elements with reference to MIMO pilot modes used respectively by the target primary and secondary carrier cells comprises:
when the drift radio network control judges that the target primary carrier cell does not use the MIMO pilot mode of the primary and secondary common pilot channels in a downlink direction, and the target secondary carrier cell uses the MIMO pilot mode of the primary and secondary common pilot channels in the downlink direction, the drift radio network control setting the information element of the power offset information of the secondary common pilot channel of the single carrier cell as null, setting the information element of the power offset information of the secondary common pilot channel of the primary carrier cell as null, and setting the power offset of the secondary common pilot channel of the target secondary carrier cell into the information element of the power offset information of the secondary common pilot channel of the secondary carrier cell.

7. The method according to claim 1, after the step of the drift radio network control feeding back the set information elements to the serving radio network control through an interconnection interface between the radio network controls, further comprising:

after the serving radio network control receives the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell fed back by the drift radio network control, determining the MIMO pilot modes used by the target primary and/or secondary carrier cell, and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element.

8. A method for receiving power offset information of a secondary common pilot channel, comprising:

when a terminal prepares to move across an interconnection interface (IUR) between radio network controls, a serving radio network control to which the terminal belongs sending request information to a drift radio network control, wherein, the request information is used for requesting the drift radio network control to feed back power offset information of respective secondary common pilot channels of target primary and secondary carrier cells managed by the drift radio network control; and after the serving radio network control receiving following information elements which are set by the drift radio network control with reference to multiple-input multiple-output (MIMO) pilot modes used respectively by the target primary and secondary carrier cells and fed back by the drift radio network control through the IUR: an information element of power offset information of a secondary common pilot channel of a single carrier cell, an information element of power offset information of a secondary common pilot channel of a primary carrier cell, and an information element of power offset information of a secondary common pilot channel of a secondary carrier cell, the serving radio network control determining the MIMO pilot modes used by the target primary carrier cell and/or the secondary carrier cell and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element;

wherein, the MIMO pilot modes used respectively by the target primary and secondary carrier cells include: whether the target primary carrier cell uses the MIMO pilot mode of the primary and secondary common pilot channels in a downlink direction and whether the target secondary carrier cell uses the MIMO pilot mode of the primary and secondary common pilot channels in a downlink direction.

9. The method according to claim 8, wherein, the serving radio network control is an old version of the serving radio network control, that is, a serving radio network control which can only identify the information element of the power offset information of the secondary common pilot channel of the single carrier cell;

the step of the serving radio network control determining the MIMO pilot modes used by a target primary carrier cell and/or a secondary carrier cell, and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element comprises:

when the old version of the serving radio network control judges that the information element of the power offset information of the secondary common pilot channel of the single carrier cell is null, determining that both the target primary carrier cell and the target secondary carrier cell do not use the MIMO pilot mode of the primary and secondary common pilot channels in a downlink direction;

when the old version of the serving radio network control judges that the information element of the power offset information of the secondary common pilot channel of the single carrier cell is not null, determining that both the target primary carrier cell and the target secondary carrier cell use the MIMO pilot mode of the primary and secondary common pilot channels in the downlink direction, and the power offset of the secondary common pilot channel of the target primary carrier cell and the power offset of the secondary common pilot channel of the target secondary carrier cell are the same, which both equal to a value of the information element of the power offset information of the secondary common pilot channel of the single carrier cell.

10. The method according to claim 8, wherein, the serving radio network control is a new version of the serving radio network control, that is, a serving radio network control which can identify following information elements: the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell;

the step of the serving radio network control determining the MIMO pilot modes used by a target primary carrier cell and/or a secondary carrier cell, and the power offset information of the secondary common pilot channel corresponding to the MIMO pilot modes when the target primary carrier cell and/or the secondary carrier cell uses the MIMO pilot mode of the primary and secondary common pilot channels, according to contents carried in the information element comprises:

when the new version of the serving radio network control judges that the information element of the power offset information of the secondary common pilot channel of the single carrier cell is not null, determining that both the target primary carrier cell and the target secondary carrier cell use the MIMO pilot mode of the primary and secondary common pilot channels in the downlink direction, and the power offset of the secondary common pilot channel of the target primary carrier cell and the power offset of the secondary common pilot channel of the target secondary carrier cell are the same, which both equal to a value of the information element of the power offset information of the secondary common pilot channel of the single carrier cell;

when the new version of the serving radio network control judges that the information element of the power offset information of the secondary common pilot channel of the single carrier cell is null, and the information element of the power offset information of the secondary common pilot channel of the primary carrier cell is not null, determining that the target primary carrier cell uses the MIMO pilot mode of the primary and secondary common pilot channels in the downlink direction and a value of the power offset of the secondary common pilot channel of the target primary carrier cell equals to a value of the information element of the power offset information of the secondary common pilot channel of the primary carrier cell;

when the new version of the serving radio network control judges that the information element of the power offset information of the secondary common pilot channel of the single carrier cell is null and the information element of the power offset information of the secondary common pilot channel of the primary carrier cell is null, determining that the target primary carrier cell does not use the MIMO pilot mode of the primary and secondary common pilot channels in the downlink direction;

when the new version of the serving radio network control judges that the information element of the power offset information of the secondary common pilot channel of the single carrier cell is null, and the information element of the power offset information of the secondary common pilot channel of the secondary carrier cell is not null, determining that the target secondary carrier cell uses the MIMO pilot mode of the primary and secondary common pilot channels in the downlink direction, and a value of the power offset of the secondary common pilot channel of the target secondary carrier cell equals to a value of the information element of the power offset information of the secondary common pilot channel of the secondary carrier cell;

when the new version of the serving radio network control judges that the information element of the power offset information of the secondary common pilot channel of the single carrier cell is null, and the information element of the power offset information of the secondary common pilot channel of the secondary carrier cell is null, determining that the target secondary carrier cell does not use the MIMO pilot mode of the primary and secondary common pilot channels in the downlink direction.

11. A radio network control for transmitting power offset information of a secondary common pilot channel, wherein, the radio network control acts as a drift radio network control, and the radio network control comprises a receiving module, a setting module and a sending module, wherein the receiving module is configured to receive request information sent by a serving radio network control, and the request information is used for requesting the drift radio network control to feed back power offset information of respective secondary common pilot channels of target primary and secondary carrier cells managed by the drift radio network control;

the setting module is configured to, after the receiving module receives the request information sent by the serving radio network control, set following information elements with reference to multiple-input multiple output (MIMO) pilot modes used respectively by the target primary and secondary carrier cells: an information element of power offset information of a secondary common pilot channel of a single carrier cell, an information element of power offset information of a secondary common pilot channel of a primary carrier cell, and an information element of power offset information of a secondary common pilot channel of a secondary carrier cell;

the sending module is configured to feed back the set information elements to the serving radio network control through an interconnection interface between the radio network controls;

wherein, the MIMO pilot modes used respectively by the target primary and secondary carrier cells include: whether the target primary carrier cell uses the MIMO pilot mode of the primary and secondary common pilot channels in a downlink direction and whether the target secondary carrier cell uses the MIMO pilot mode of the primary and secondary common pilot channels in a downlink direction.

12. The radio network control according to claim 11, wherein, the setting module comprises a first judgment unit and a first information element setting unit, wherein the first judgment unit is configured to: when judging that both the target primary and secondary carrier cells do not use the MIMO pilot mode of the primary and secondary common pilot channels in a downlink direction, notify the first information element setting unit;

the first information element setting unit is configured to: set the information element of the power offset information of the secondary common pilot channel of the single carrier cell, the information element of the power offset information of the secondary common pilot channel of the primary carrier cell, and the information element of the power offset information of the secondary common pilot channel of the secondary carrier cell all as null;

the setting module further comprises a second judgment unit and a second information element setting unit, wherein, the second judgment unit is configured to: when judging that both the target primary and secondary carrier cells use the MIMO pilot mode of the primary and secondary common pilot channels in the downlink direction, and a power offset of the secondary common pilot channel of the target primary carrier cell and a power offset of the secondary common pilot channel of the target secondary carrier cell are the same, notify the second information element setting unit;

the second information element setting unit is configured to: set the power offset into the information element of the power offset information of the secondary common pilot channel of the single carrier cell, and set the information element of the power offset information of the secondary common pilot channel of the primary carrier cell and the information element of the power offset information of the secondary common pilot channel of the secondary carrier cell as null;

the setting module further comprises a third judgment unit and a third information element setting unit, wherein the third judgment unit is configured to: when judging that both the target primary and secondary carrier cells use the MIMO pilot mode of the primary and secondary common pilot channels in the downlink direction, while the power offset of the secondary common pilot channel of the target primary carrier cell and the power offset of the secondary common pilot channel of the target secondary carrier cell are different, notify the third information element setting unit;

the third information element setting unit is configured to: set the information element of the power offset information of the secondary common pilot channel of the single carrier cell as null, set the power offset of the secondary common pilot channel of the target primary carrier cell into the information element of the power offset information of the secondary common pilot channel of the primary carrier cell, and set the power offset of the secondary common pilot channel of the target secondary carrier cell into the information element of the power offset information of the secondary common pilot channel of the secondary carrier cell;

the setting module further comprises a fourth judgment unit and a fourth information element setting unit, wherein the fourth judgment unit is configured to: when judging that the target primary carrier cell uses the MIMO pilot mode of the primary and secondary common pilot channels in the downlink direction, while the target secondary carrier cell does not use the MIMO pilot mode of the primary and secondary common pilot channels in the downlink direction, notify the fourth information element setting unit;

the fourth information element setting unit is configured to: set the information element of the power offset information of the secondary common pilot channel of the single carrier cell as null, set the power offset of the secondary common pilot channel of the target primary carrier cell into the information element of the power offset information of the secondary common pilot channel of the primary carrier cell, and set the information element of the power offset information of the secondary common pilot channel of the target secondary carrier cell as null;

the setting module further comprises a fifth judgment unit and a fifth information element setting unit, wherein, the fifth judgment unit is configured to: when judging that the target primary carrier cell does not use the MIMO pilot mode of the primary and secondary common pilot channels in the downlink direction, and the target secondary carrier cell uses the MIMO pilot mode of the primary and secondary common pilot channels in the downlink direction, notify the fifth information element setting unit; and the fifth information element setting unit is configured to: set the information element of the power offset information of the secondary common pilot channel of the single carrier cell as null, set the information element of the power offset information of the secondary common pilot channel of the primary carrier cell as null, and set the power offset of the secondary common pilot channel of the target secondary carrier cell into the information element of the power offset information of the secondary common pilot channel of the secondary carrier cell.

* * * * *